United States Patent [19]

Komenda et al.

[11] 4,080,242

[45] Mar. 21, 1978

[54] APPARATUS FOR SPLICING PHOTOGRAPHIC FILMS OR THE LIKE

[75] Inventors: Franz Komenda, Munich; Klaus Weber, Ebersberg; Adolf Höfler, Unterfohring; Gerhard Küstner, Munich, all of Germany

[73] Assignee: AGFA-Gevaert, A.G., Leverkusen, Germany

[21] Appl. No.: 751,313

[22] Filed: Dec. 16, 1976

[30] Foreign Application Priority Data

Dec. 20, 1975 Germany .............................. 2557754
Sep. 8, 1976 Germany .............................. 2640476

[51] Int. Cl.² ........................ B31F 15/00; B32B 31/00
[52] U.S. Cl. .................................... 156/506; 152/520; 152/583
[58] Field of Search ............... 156/502, 505, 506, 520, 156/583

[56] References Cited

U.S. PATENT DOCUMENTS

| | | | |
|---|---|---|---|
| 2,480,794 | 8/1949 | Waggoner | 156/502 |
| 3,634,171 | 1/1972 | Rosborough | 156/506 |
| 3,986,919 | 10/1976 | Andrews | 156/502 |
| 4,012,274 | 3/1977 | Lang-Ree | 156/502 |

Primary Examiner—Douglas J. Drummond
Attorney, Agent, or Firm—Peter K. Kontler

[57] ABSTRACT

Apparatus for splicing successive exposed photographic films end-to-end by means of uniting bands one side of which is coated with hotmelt has a ribbon which is severed at regular intervals at the splicing station to yield a succession of uniting bands. Each band is caused to overlie the ends of films at the splicing station and is thereupon pressed against the films by two heated rams which move toward each other as soon as a fresh band is separated from the ribbon. The ribbon is retracted from the splicing station immediately upon severing to avoid the flow of hotmelt thereon as a result of heating action of the rams.

35 Claims, 8 Drawing Figures

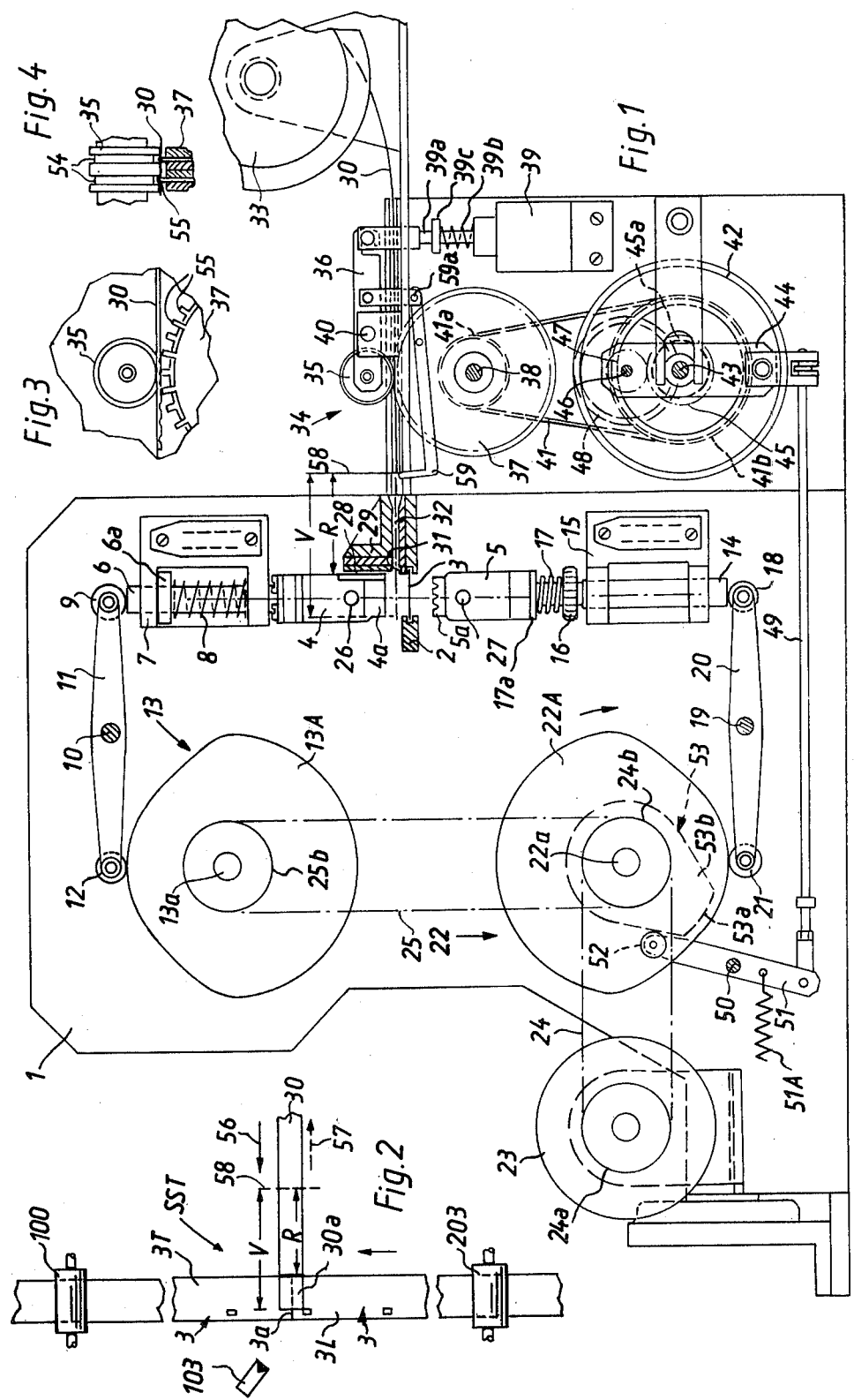

APPARATUS FOR SPLICING PHOTOGRAPHIC FILMS OR THE LIKE

BACKGROUND OF THE INVENTION

The present invention relates to improvements in apparatus for attaching flexible strips or sheets to each other by means of uniting bands, and more particularly to improvements in apparatus which are especially suited for the splicing of trailing and leading ends of successive photographic films end-to-end in a photographic processing laboratory. Still more particularly, the invention relates to improvements in splicing apparatus of the type wherein the leading end of the next-following strip is attached to the trailing end of the preceding strip by a uniting band which is severed from a ribbon or tape and is caused to adhere to the strips due to the presence of an adhesive and/or under the action of heat.

Automatic or semiautomatic manipulation of photographic films in processing laboratories necessitates the conversion of a large number of successive discrete customer films into an elongated web which is convoluted onto the core of a takeup reel and is transferred into the developing machine. The developed web is thereupon caused to pass through a copying machine which makes prints of all or selected film frames before the web is subdivided into discrete films or sections of films which are assembled with associated prints and placed into envelopes for delivery or shipment to dealers or customers. The conversion of discrete films into a relatively long web (which normally consists of more than one-hundred films) brings about substantial savings in time for processing of the films. However, proper processing of a web requires the making of satisfactory splices between successive films in order to avoid breakage of the web during transport through the developing or copying machine. Moreover, the splicing operation must be carried out automatically and within short intervals of time. In many instances, the splicing operation involves the use of uniting bands which are bonded to the adjacent ends of two films, preferably in the presence of heat.

A splicing apparatus which connects successive films to each other end-to-end by resorting to uniting bands which are applied to the presence of heat is disclosed in U.S. Pat. No. 3,634,171. The uniting bands are fed to the splicing station by moving them in an elongated guide rail. The trailing end of the preceding film (which constitutes the last film of a web) is already located at the splicing station, and the splicing operation can begin as soon as the leading end of the next-following film is moved to an optimum position with respect to the trailing end of the preceding film. The next following film is a discrete film which has been withdrawn from a cassette and has been introduced into a suitable channel for transport toward the splicing station. The splicing apparatus includes a heatable ram which is mounted at a level above the splicing station and is moved downwardly to press the foremost uniting band against the adjacent ends of the films. The temperature of the ram suffices to insure melting of the adhesive layer (e.g., a hotmelt) at the underside of the uniting band which overlies the films at the splicing station. The uniting bands are obtained by withdrawing a tape from a reel and severing it at regular intervals. The severing means includes a knife on the ram and a counterknife on a table adjacent the path of movement of the ram. Thus, the leader of the tape must be introduced into the splicing station so that it extends beyond the severing plane, and such leader is converted into a uniting band in response to descent of the ram which carries the mobile knife of the severing device. The length of the uniting band, as considered in the longitudinal direction of the tape, equals or approximates the width of a film. In order to insure proper and reproducible transport of the tape, the latter is formed with perforations and the transporting mechanism includes a sprocket wheel having teeth which enter the perforations to advance the tape toward the splicing station whenever the wheel rotates. Detent means is provided to hold the tape against movement when the wheel is idle.

A drawback of the just described conventional apparatus is that the adhesive layer on a uniting band requires prolonged heating before it assumes a condition in which it forms a strong and reliable bond between the films whose ends are located at the splicing station. Furthermore, even prolonged heating of uniting bands does not guarantee the making of reliable splices. Still further, the heated ram melts the adhesive at the leading end of the tape portion immediately behind a freshly separated uniting band so that the molten adhesive contaminates the splicing station, particularly the knives of the severing device and the channel wherein the tape is fed into the range of the heated ram. This necessitates frequent and lengthy interruptions for the purpose of cleaning with attendant losses in output. Also, and since at least some of the splices are not reliable, the web is likely to break during coiling onto the core of the takeup reel which causes additional lengthy interruptions. The likelihood of melting of adhesive on the leader of the tape is especially pronounced if the operation of the splicing apparatus is interrupted for a relatively long interval of time while the heating means for the ram remains operative.

OBJECTS AND SUMMARY OF THE INVENTION

An object of the invention is to provide a novel and improved splicing apparatus which can secure successive films or analogous strips to each other in a fully automatic way, with a high degree of reproducibility and without any or with negligible contamination of the splicing station in spite of the fact that the apparatus may and preferably does employ heated splicing means for transmission of heat to uniting bands whose bonding action is enhanced in response to heating.

Another object of the invention is to provide the apparatus with novel and improved means for transporting the ribbon or tape which is converted into heatable uniting bands.

A further object of the invention is to provide the apparatus with novel and improved tape severing means.

An additional object of the invention is to provide the apparatus with a novel and improved splicing unit which is capable of uniting successive films or the like with a heretofore unmatched degree of reproducibility and which can form splices that are strong enough to readily withstand all tensional stresses which are anticipated during transport of the web through a developing or copying machine.

An ancillary object of the invention is to provide the apparatus with novel and improved means for moving the mobile components of the splicing unit.

A further object of the invention is to provide novel and improved means for transmitting motion to the tape transporting mechanism in response to movement of mobile parts of the splicing unit, or vice versa.

Another object of the invention is to provide a splicing apparatus which occupies little room, which requires a minimum of maintenance, which can be installed in photographic processing laboratories as a superior substitute for existing splicing apparatus, and which can operate without any or with negligible waste in uniting material.

An additional object of the invention is to provide a splicing apparatus which, even though especially suited for the uniting of photographic films, is susceptible of many other uses wherever or whenever two or more strips of flexible material are to be attached to each other by resorting to heat-activatable bonding material.

The invention is embodied in an appartus for splicing successive flexible strips end-to-end, particularly for splicing exposed photographic films by means of uniting bands whose uniting action is enhanced by heating. The apparatus comprises means for conveying successive strips lengthwise along a predetermined path so as to place the leading end of each next-following strip close to the trailing end of the preceding strip at a splicing station which constitutes a portion of the path for successive strips, a source of heatable uniting bands (such source may include a reel for a tape or ribbon of coherent uniting bands), means for feeding uniting bands seriatim from the source into register with the ends of strips at the splicing station, and means for attaching the uniting band at the splicing station to the adjacent ends of strips. The attaching or splicing means includes first and second splicing members facing each other and disposed at the opposite sides of the ends of strips at the splicing station with a uniting band located between the first splicing member and the ends of strips, means for heating the splicing members, and means for moving at least one of the splicing members between retracted and operative positions in which the one splicing member is respectively remote from and nearer to the other splicing member so that the splicing members heat and thereby bond the uniting band therebetween to the adjacent ends of strips when the one splicing member assumes its operative position.

In accordance with a feature of the invention, the aforementioned source includes a tape or ribbon of coherent uniting bands, and the feeding means comprises means for transporting the ribbon along a second path between the source and the splicing station, first forwardly to place the leader of the ribbon into register with the ends of strips at the splicing station and thereupon rearwardly. Such apparatus further comprises means for separating the leader of the ribbon at the splicing station from the next-following portion of the ribbon prior to rearward movement of the next-following portion of the ribbon. The separated leader then constitutes a uniting band which is ready to be bonded to the adjacent ends of the strips as soon as the one splicing member assumes its operative position. Retraction of the next-following portion of the ribbon is desirable and advantageous because this reduces the likelihood of contamination of the splicing station and/or of the separating means as a result of heating of the bonding agent (e.g., a hotmelt) on the ribbon behind the separated uniting band.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a transverse vertical sectional view of a splicing apparatus which embodies the invention;

FIG. 2 is a plan view of the splicing station;

FIG. 3 is an enlarged side elevational view of a detail of the ribbon feeding means in the apparatus of FIG. 1;

FIG 4 is an end elevational view of the structure shown in FIG. 3;

DESCRIPTION OF THE PREFERRED EMBODIMENTS

Figure 5:
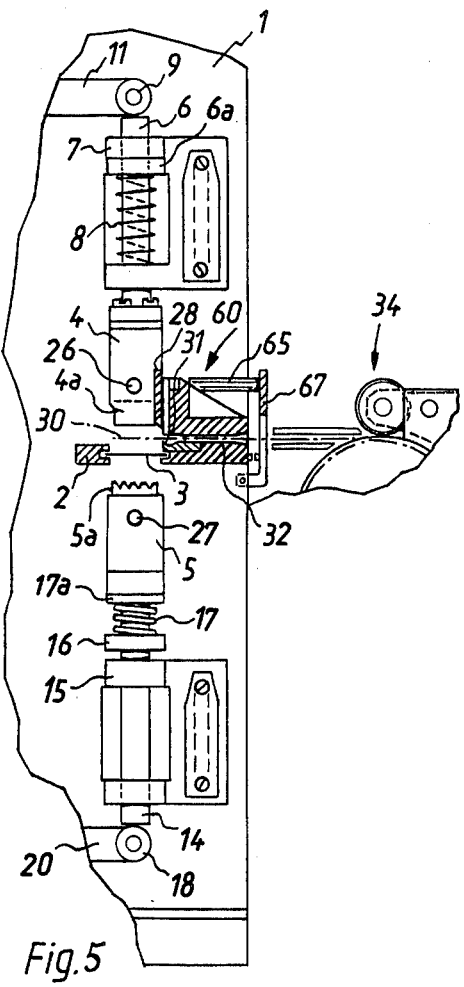
FIG. 5 is an enlarged view of another detail in FIG. 1, showing the splicing members, the splicing station between the splicing members, portions of means for moving the splicing members between retracted and operative positions, and the ribbon severing means.

Referring to FIGS. 1 and 5, the splicing apparatus comprises a frame or housing 1 which supports a substantially horizontal guide 2 for a succession of elongated photographic films 3 (see also FIG. 2) which are to be spliced together end-to-end in accordance with the present invention. A portion of the guide 2 may form part of a holder 61 (best shown in FIG. 6), and this guide has two shallow grooves or channels 2a (refer again to FIG. 6) which receive the marginal portions of the films 3. Thus, the major part of the upper side and underside of each film 3 in the guide 2 is exposed.

The splicing station SST (see FIG. 2) at which the trailing end 3T of a preceding film 3 is attached to the leading end 3L of the next-following film 3 is disposed between two reciprocable splicing members or rams 4 and 5 (best shown in FIGS. 1 and 5). The ram 4 is located above the horizontal path for the films 3, and the ram 5 is mounted in axial alignment with the ram 4 below such path. The common axis of the rams 4 and 5 is preferably normal to the common plane of the trailing end 3T and leading end 3L at the splicing station SST, and such common axis intersects the line of contact between the rear edge face of 3T and the front edge face 3a of 3L midway or nearly midway between the marginal portions of the films, i.e., midway between the channels 2a of the guide 2. The lower end portion 4a of the ram 4 is preferably provided with a flat bottom end face (see particularly FIG. 5) whereas the top end face of the upper end portion 5a of the lower ram 5 is preferably knurled, toothed or otherwise serrated. The end portion 5a can engage the abutting portions of two films 3 from below, and the end portion 4a serves to press a uniting band 30a against the upper sides of such abutting portions. The shape as well as the material of each end portion (4a, 5a) is selected with a view to insure the formation of a reliable bond between the trailing end 3T and the leading end 3L through the intermediary of the uniting band 30a.

The upper end portion of the upper ram 4 is provided with or connected to an upwardly extending rod or shank 6 which is guided in a vertical tubular bearing member 7 secured to the frame 1. The bearing member 7 contains a helical spring 8 which reacts against the member 7 and bears against a collar 6a of the shank 6 to urge the ram 4 upwardly and away from the splicing station SST and to maintain the upper end face of the shank 6 in permanent contact with a roller 9 mounted at the free end of the right-hand arm (as viewed in FIG. 1) of a two-armed lever 11 which is mounted on a pivot member 10 of the frame 1. The other arm of the lever 11 carries a roller follower 12 which tracks the peripheral surface of a rotary disk-shaped cam 13 mounted on a shaft 13a which is installed in the frame 1. FIG. 1 shows the lower end face of the end portion 4a of ram 4 at a maximum distance from the path for the films 3, i.e., the ram 4 is held in the retracted position.

The lower ram 5 is coupled to a rod or shank 14 which is reciprocable in an upright tubular bearing member 15 secured to the frame 1. A helical spring 17 couples a collar 17a of the ram 5 to a collar 16 of the shank 14. The lower end face of the shank 14 is in contact with a roller 18 mounted at the free end of the right-hand arm (as viewed in FIG. 1) of a two-armed lever 20 which is fulcrumed in the frame 1, as at 19, and the other arm of which carries a roller follower 21 tracking the peripheral surface of a disk-shaped rotary cam 22 mounted on a shaft 22a which is installed in the frame 1. FIG. 1 shows the ram 5 in the lower or retracted position in which the serrated top end face of the end portion 5a is located at a maximum distance from the underside(s) of the film(s) 3 at the splicing station SST. The end portion 5a and shank 14 constitute two coaxial sections of the ram 5; such sections are coupled to each other by the spring 17 which stores energy when the rams 4, 5 assume their operative positions in which the end portions 4a, 5a heat a uniting band and bias it against the adjacent ends 3L, 3T of two films at the splicing station SST.

It is preferred to mount the end portion of at least one of the rams 4, 5 in such a way that it has some freedom of movement with respect to the main body portion of the respective ram. This insures that the end faces of both end portions (4a, 5a) lie flush against the respective sides of the films 3 during splicing of such films at the station SST. In the illustrated embodiment, the end portion 5a is free to swivel or wobble in the main body portion of the lower ram 5 and thereby enables its serrated top end face to lie flush against the undersides of the leading end 3L and trailing end 3T while the lower end face of the end portion 4a urges a uniting band 30a against the upper sides of the films opposite the end portion 5a.

The cams 13 and 22 can be rotated by a prime mover 23 (e.g., an electric motor which is mounted in the frame 1) through the medium of endless chains or belts 24 and 25. The chain or belt 24 is driven by a sprocket wheel or pulley 24a on the output shaft of the motor 23 and drives a sprocket wheel or pulley 24b which rotates with the cam 22. The sprocket wheel or pulley 24b is rigid with or includes a second sprocket wheel or pulley which drives the chain or belt 25 and hence a sprocket wheel or pulley 25b which is mounted on the shaft 13a and serves to transmit torque to the cam 13. When the motor 23 is on, the cams 13 and 22 rotate clockwise, as viewed in FIG. 1.

The rams 4, 5 are provided with heating means here shown as cartridges 26, 27 which are connected to a suitable energy source, not shown. Furthermore, the right-hand side of the upper ram 4 (as viewed in FIGS. 1, 5 or 6) supports the mobile plate-like knife 28 forming part of a separating or severing device 60 and cooperating with a stationary plate-like second knife or counterknife 31 mounted on a resilient supporting bracket 29. The aforementioned holder 61 of the severing device 60 defines a horizontal channel 32 located at a level slightly above the upper side of a film 3 in the guide 2 and extending substantially or exactly at right angles to the direction of lengthwise movement of films. The bracket 29 for the counterknife 31 is mounted on the holder 61 in the region of the discharge end of the channel 32. A tape or ribbon 30 whose leader is severed by the device 60 to yield a succession of uniting bonds 30a is stored on a reel 33 and is movable in a channel 32 toward and away from the splicing station SST by an intermittently operated feeding or transporting mechanism 34.

The tape transporting or feeding mechanism 34 comprises a pressure roll 35 which is mounted on a lever 36 at a level above the path of the tape 30 upstream of the channel 32 and opposite a toothed rotary member or wheel 37 which is located below such path. The wheel 37 is mounted on a stationary horizontal shaft 38 and the lever 36 is mounted on a horizontal pivot member 40. The pressure roll 35 is mounted on one arm of the lever 36 and the other arm of this lever is coupled to the reciprocable armature 39a of an electromagnet 39 which is installed in the housing 1. The armature 39a is biased by a helical spring 39b which reacts against a stationary retainer 39c and tends to pivot the lever 36 clockwise, as viewed in FIG. 1, so as to disengage the pressure roll 35 from the tape 30. When the electromagnet 39 is energized, the lever 36 is pivoted anticlockwise and the roll 35 urges the tape 30 against the needles of the wheel 37 which is driven by a planetary transmission through the medium of an endless toothed belt 41 and toothed pulley 41a on the shaft 38. The transmission includes a horizontal shaft 43 which is parallel to the shaft 38 and carries a relatively large internal gear 42, an oscillatable lever 44 and a spur gear 45. The upper end portion of the lever 44 (as viewed in FIG. 1) carries a shaft 46 for a pinion 47 which mates with the gear 45, and a pinion 48 which mates with the internal gear 42. The lower end portion of the lever 44 is articulately coupled to one end of an elongated connecting rod 49 the other end of which is articulately coupled to the lower arm of a two-armed lever 51 which is fulcrumed in the housing 1, as at 50. The upper arm of the lever 51 carries a roller follower 52 which tracks the peripheral surface of a cam 53 on the shaft 22a for the cam 22. A second toothed pulley 41b for the belt 41 is mounted on the shaft 43 and can receive torque from the gear 45 through the medium of a friction clutch 45a. The illustrated transmission causes the wheel 37 to rotate in one direction when the connecting rod 49 is moved in a direction to the right, as viewed in FIG. 1, and to rotate in the other direction when the connecting rod 49 is moved in a direction to the left.

The planetary transmission of FIG. 1 is but one of the means which can be used for intermittently feeding the tape 30 toward the splicing station SST in such a way that the tape first moves forwardly through a first distance and is thereupon retracted through a shorter second distance.

The exact configuration of the pressure roll 35 and toothed wheel 37 is shown in FIGS. 3 and 4. The peripheral surface of the roll 35 has endless circumferential grooves 54 in line with the rows of needles or teeth 55 at the periphery of the wheel 37. In the illustrated embodiment, the roll 35 has two grooves 54 and the wheel 37 has two rows of needles 55. The needles 55 extend radially outwardly beyond the periphery of the wheel 37 and their tips engage the adhesive-coated underside of the tape 30. This is particularly important when the nature of adhesive is such that it would tend to adhere to the periphery of a roll or wheel during a prolonged period of idleness of the transporting device 34, especially if the adhesive layer were biased against such periphery. Moreover, the relatively thin needles 55 of the wheel 37 insure a predictable transport of the tape 30 toward or away from the splicing station SST. The grooves 54 and the needles 55 can be said to constitute a means for minimizing the extent of contact between the tape 30 and the tape-engaging parts of the feeding mechanism 34.

The operation of the heretofore described parts of the apparatus is as follows:

When the transporting mechanism for the films 3 places the trailing end 3T of a preceding film 3 and the leading end 3L of the next-following film 3 in an optimum position for splicing at the station SST, the film conveying mechanism is arrested in response to a signal from a photoelectric cell or another suitable detector 103. FIG. 2 shows an intermittently driven wheel 203 which forms part of the film transporting mechanism. The detector 103 can monitor the front edge 3a of the leading end 3L to arrest the next-following film 3 when such edge 3a abuts or is immediately adjacent to the rear edge of the trailing end 3T. The preceding film 3 of FIG. 2 is assumed to constitute the rearmost film of an elongated web whose leader is attached to a takeup reel serving to collect the web prior to introduction into the developing machine in a photographic processing laboratory for exposed customer films. The reel is driven as soon as the apparatus completes the making of a splice between the films shown in FIG. 2 and is arrested when the rear edge of the trailing end of the lower film shown in FIG. 2 comes to a halt in a position corresponding to that of the rear edge on the trailing edge 3T of the upper film of FIG. 2.

The detector 103 transmits a signal when the lower film of FIG. 2 assumes the illustrated position, and such signal is used to complete the circuit of the motor 23 which causes each of the shafts 13a and 22a to complete one revolution (in a clockwise direction, as viewed in FIG. 1). The cams 13 and 22 respectively cause the levers 11 and 20 to move the rams 4 and 5 toward each other. The leader of the tape 30 is assumed to overlie the films 3 at the splicing station SST not later than when the end portion 4a of the upper ram 4 engages the tape 30 from above, whereby the knife 28 (which shares the downward movement of the ram 4) severs the leader of the tape 30 in cooperation with the counterknife 31 and the thus separated leader of the tape constitutes a uniting band 30a which overlies the films at the splicing station. The distance between the plane of the tape 30 in the channel 32 and the plane of the films 3 at the splicing station SST is relatively small, e.g., 2 millimeters. Such planes are parallel to each other. The springs 8 and 17 store energy during movement of the rams 4 and 5 toward each other, and the end portions 4a, 5a of the rams press the freshly obtained uniting band 30a against the trailing end 3T and leading end 3L at the splicing station SST while the roller followers 12, 21 respectively track the lobes 13A, 22A of the cams 13, 22. The uniting band 30a is heated because the cartridges 26, 27 of the rams 4, 5 are connected with the energy source and heat the respective end portions 4a and 5a. The length of lobes 13A, 22A (as considered in the circumferential direction of the respective cams 13, 22) and the speed of the motor 23 are selected in such a way that the uniting band 30a is subjected to pressure for a predetermined interval of time. The cams 13 and 22 continue to rotate whereby the springs 8 and 17 move the rams 4 and 5 away from the plane of the films 3 at the splicing station SST (the ram 5 can also descend by gravity), and the end portions 4a, 5a of the rams reassume the retracted positions of FIG. 1 when each of the shafts 13a, 22a completes a full revolution. One of the levers 11, 20, one of the rams 4, 5 or another part which shares the movements of (or moves in synchronism with) the rams thereupon causes the reel for the aforementioned web to rotate in a direction to collect the web. The web comes to a halt when the rear edge of its rearmost film 3 (namely, the lower film of FIG. 2) reaches the position corresponding to that of the rear edge on the trailing end 3T shown in FIG. 2.

The tape transporting or feeding mechanism 34 is set in motion simultaneously with starting of the motor 23 because the latter drives the cam 53 which transmits motion to the lever 51 and connecting rod 49. The roller follower 52 tracks the peripheral surface of the rotating cam 53 and pivots the lever 51 anticlockwise, as viewed in FIG. 1, so that the lever 51 pushes the rod 49 in a direction to the right whereby the rod 49 pivots the lever 44 anticlockwise. The planetary transmission multiples such angular displacement of the lever 44 and causes the belt 41 to rotate the wheel 37 anticlockwise. The electromagnet 39 is energized simultaneously with start of rotation of the wheel 37 in a manner well known from the art so that the armature 39a pivots the lever 36 counterclockwise and urges the pressure roll 35 against the upper side of the tape 30 opposite the rotating wheel 37. The parts 35 and 37 thereby cooperate to move the tape 30 forwardly, i.e., in the channel 32 and toward the splicing station SST. The forward movement of tape 30 is terminated before its upper side is engaged by the descending lower end portion 4a of the upper ram 4 and before the knife 28 severs the leader of the tape 30 to form a uniting band 30a. The tape 30 is thereupon at a standstill for a given interval of time which depends on the length of the top land 53a of the lobe 53b on the cam 53 and during which the tape is severed by the device 60. The center of curvature of the top land 53a is located on the axis of the shaft 22a which insures that the wheel 37 does not advance the tape 30 while the roller follower 52 engages the top land 53a. The roller follower 52 is in permanent engagement with the peripheral surface of the cam 53 under the action of a spring 51A so that the rod 49 begins to move in a direction to the left as soon as the lobe 53b moves beyond the roller follower 52. One of the shafts in the planetary transmission of FIG. 1 is held against rotation in one direction (namely, in a direction corresponding to leftward movement of the connecting rod 49) by an overrunning clutch, not shown. Furthermore, the pulley 41b must rotate against the opposition of the friction clutch 45a with the result that the extent of movement of the tape 30 in a direction to the right, as viewed in FIG. 1 (while the connecting rod 49 moves in a direction to the left), is less than the extent of leftward movement of the tape 30 at the start of rotation of the shaft 22 and 53. In other words, the extent to which the tape 30 is retracted from the station SST during the second stage of rotation of the cam 53 (while the connecting rod 49 moves in a direction to the left) is less than the extent of forward movement of the tape during movement of the top land 53a of the lobe 53b toward engagement with the roller follower 52. The difference preferably equals the length of a uniting band 30a.

The directions in which the tape 30 moves forwardly and rearwardly are indicated in FIG. 2 by arrows 56 and 57. The extent of forward movement of the tape 30 is shown at V, and the extent of rearward movement is shown at R. The difference between V and R equals the length of the uniting band 30a. The broken line 58 denotes the position of the front edge of the leader of tape 30 prior to starting of the motor 23.

As mentioned above, the planetary transmission in the lower right-hand portion of FIG. 1 is but one of the means which can be used to advance the tape 30 through the distance V and to thereupon retract the tape through the distance R. For example, the planetary transmission can be replaced by a reversible motor and a transmission which is driven by the motor and has a first ratio while the motor rotates its output element in a first direction (to move the tape 30 forwardly) and a different second ratio while the motor rotates its output element in reverse (to thereby retract the tape 30 in the direction indicated by arrow 57). The means for reversing the just discussed motor can receive a signal from a device which monitors the angular position of the cam 13 or 22 or from any other part which shares the movements of or moves in synchronism with such cams.

If desired, the apparatus may comprise a locating device which facilitates proper positioning of the leading edge 58 of a freshly introduced supply of tape 30. FIG. 1 shows a locating device in the form of an L-shaped lever 59 which is pivoted to the frame 1, as at 59a, and is movable from a retracted or idle position to the operative position of FIG. 1 in which its shorter leg (which constitutes a stop) extends across the path of forward movement of the tape 30. The lever 59 is allowed or caused to reassume its idle position as soon as the leading edge of the fresh tape 30 reaches the optimum position (broken line 58) with respect to the splicing station SST. This insures that, when the motor 23 is started again, the knives 28 and 31 will form a uniting band 30a of optimum length (as considered transversely of the direction of forward movement of films 3 in the guide 2). When the locating lever 59 is held in the operative position of FIG. 1, the right-hand side of its shorter leg or stop is located in the plane of the broken line 58.

The improved splicing apparatus exhibits the advantage that the distribution of heat at the splicing station is much more satisfactory than in the apparatus of the aforediscussed U.S. Pat. No. 3,634,171. This is attributable to the fact that the improved apparatus comprises means (cartridges 26, 27 or analogous heating means) for heating each of the rams 4 and 5, i.e., for heating a uniting band 30a (which registers with the film ends 3L, 3T at the splicing station SST) not only from above but also from below. Such dual heating of the uniting band results in rapid activation of the adhesive layer thereon, i.e., the adhesive layer is heated more rapidly and more uniformly than in the apparatus of the U.S. Pat. No. 3,634,171 wherein the movable heated ram presses the film ends and the uniting band toward a relatively cold platform or table which rapidly removes a substantial percentage of heat energy. The thus removed heat energy is wasted because the mass of the table is much too large to guarantee satisfactory heating to a temperature at which the table would assist the mobile ram in heating the adhesive layer during the relatively short interval of dwell of the ram in its operative position of contact with the uniting band. It has been found that the conventional splicing apparatus is incapable of making satisfactory splices, especially immediately after starting when the temperature of the table matches the temperature of the surrounding atmosphere. Owing to the provision of heating means for both rams of the improved apparatus, the first splice which is made when the apparatus is started is just as satisfactory as each next-following splice. Moreover, and since the uniting band 30a at the splicing station SST is heated from both sides, the rams 4 and 5 merely require heating to a moderate temperature which reduces the likelihood that the material of the film ends 3L, 3T and of the uniting band 30a would become brittle as a result of excessive heating.

Another important advantage of the improved apparatus is that the transporting or feeding unit 34 for the ribbon or tape 30 is designed to retract the next-following portion of the tape as soon as the severing device 60 completes the separation of the leader of the tape from the remnant of tape in order to convert the leader into a discrete uniting band. Such retraction of the tape 30 immediately following each actuation of the severing device 60 insures that the adhesive layer on the unsevered part of the tape 30 cannot melt and cannot contaminate the splicing station SST and/or the surrounding parts. This will be readily appreciated by bearing in mind that the reciprocable upper ram 4 is heated at all times (or that it is continuously maintained at an optimum elevated temperature) so that the ram 4 heats the mobile knife 28 of the severing device 60. Overheating of the unsevered portion of the tape 30 would take place without fail during relatively long intervals of idleness of the feeding unit 34. Adherence of the leader of tape 30 to the surfaces bounding the channel 32 and/or to the counterknife 31 would interfere with proper feed of tape toward the splicing station SST and would necessitate lengthy interruptions of operation for the purpose of cleaning the parts of the severing device 60 and cutting off the contaminated front portion of the tape. If the adhesive layer on the tape 30 is relatively thick, if the channel 32 is relatively narrow (to insure satisfactory guidance of the leader of tape on its way to the splicing station) and if the ram 4 is heated to an elevated temperature, the omission of the tape retracting step would rapidly result in complete clogging of channel 32 with molten adhesive and in the flow of molten adhesive toward and into the splicing station.

It is further desirable to provide means for applying a relatively weak pull to the preceding film 3 immediately upon or shortly after completion of the splicing operation. This can be achieved in a number of ways, for example, by placing a pair of driven rolls immediately downstream of the splicing station SST and to select the distance between the rolls in such a way that the pull which the rolls exert upon the film 3 which passes through the nip of such rolls is very weak but suffices to maintain the film, as well as the next-following film which has been spliced thereto by means of a uniting band 30a, under some tension. An advantage of such tensioning is that the films are less likely to curl in response to cooling of the splice. It has been found that, when the freshly applied uniting band 30a is in full contact with the surrounding atmosphere (on movement of the rams 4, 5 to their retracted positions), the uniting band tends to curl or bend and to cause some bending of the adjacent film ends 3L and 3T. In other words, the splice tends to arch so that one of its sides is concave and the other side is convex. Such bending of the splice cannot be readily avoided except by the aforediscussed simple expedient of subjecting the splice-together films to tensional stresses which cannot affect the stability of the splice but greatly reduce the extent of or prevent any bending or curling. Alternatively, the means for tensioning the spliced-together films may include a loop former, e.g., a dancer roll 100 which rests in the bight of a loop formed by the preceding and/or by the next-following film. As mentioned above, the tensional stress upon the splice should be relatively small in order to avoid an opening of the splice. Any bending or curling of the web which consists of several splice-together films could interfere with proper coiling of the web onto the core of a takeup reel and/or with the transport of such web through a developing or copying machine.

Figure 6:
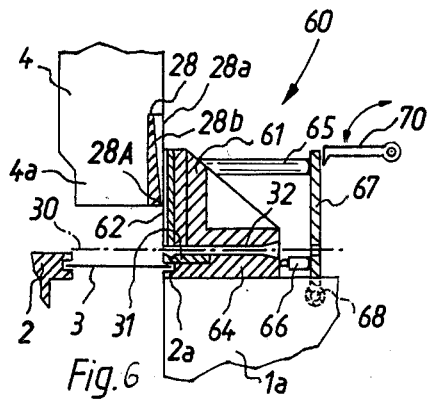
FIG. 6 is an enlarged view of the ribbon severing means which is shown in FIG. 5.
Figure 7:
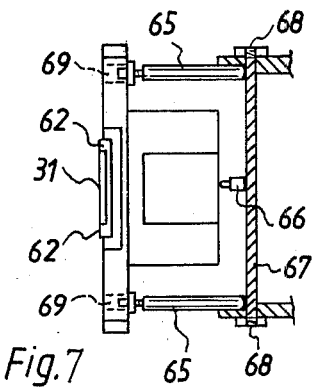
FIG. 7 is a horizontal sectional view of certain components of the ribbon severing means.
Figure 8:
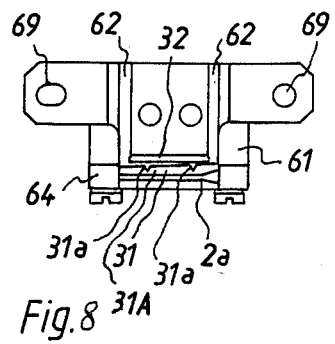
FIG. 8 is a front elevational view of such components, as seen from the left-hand side of FIG. 6.

The details of the severing device 60 are shown in FIGS. 6 to 8. The mobile knife 28 is recessed into one side of the upper ram 4 and has two spaced apart narrow parallel vertical guide faces 28a and a wide median face 28b which slopes downwardly and outwardly toward the cutting edge 28A. In other words, the thickness of the knife 28 decreases in a direction away from the lower end face of the end portion 4a of the upper ram 4. The width of the guide faces 28a increases in the same direction. The recess between the guide faces 28a and median face 28a can receive foreign matter.

The aforementioned holder 61 of the severing device 60 is a bracket having an upwardly extending portion or leg one side of which faces the knife 31. Such side of the upwardly extending leg of the bracket 61 is formed with guide faces 62 (see FIG. 8) which are adjacent the guide faces 28a of the knife 28. The counterknife 31 is located close to the lower end of the bracket 61 and its elastic support 29 is secured thereto by a member 64 which may constitute the horizontal leg of the bracket. The channel 32 is disposed at a level above the member 64 and counterknife 31. The right-hand groove 2a of the film guide 2 is machined into the member 64 below the counterknife 31.

The cutting edge 31A of the counterknife 31 is inclined with respect to a horizontal plane to insure that the knife 28 severs the tape 30 in the region of one marginal portion and toward the other marginal portion of the tape when the upper ram 4 descends under the action of the cam 13. The cutting edge 31A of the counterknife 31 is further formed with two substantially triangular notches or recesses 31a which are shown in FIG. 8. FIG. 6 shows that the counterknife 31 recedes in a direction away from the ram 4 immediately below its inclined cutting edge 31A.

The severing device 60 (with the exception of the knife 28) is mounted on a horizontal portion or platform 1a of the frame 1 and is secured to such platform by two resilient elements 65 and a further resilient element 66. The resilient elements 65 and 66 are secured to a pivotable plate-like carrier 67 which is mounted on a horizontal pintle 68 secured to the frame 1. The carrier 67 resembles the leaf of a hinge. Suitable means (e.g., a locking bolt 70) is provided to releasably hold the carrier 67 in the operative position of FIG. 6 or 7. The resilient elements 65 and 66 preferably include elongated sleeves for helical springs. The left-hand convolutions of springs which form part of resilient elements 65 extend into sockets or blind bores 69 of the holder 61 in the region of the uppermost portion of the holder. The resilient element 66 is shorter than the resilient elements 65 and is secured to the carrier 67 close to the pintle 68 to bear against the adjacent side of the support 64.

The operation of the severing device 60 is as follows:

The components 31, 61 of the device 60 are placed onto the platform 1a and the carrier 67 is thereupon pivoted anticlockwise, as viewed in FIG. 6, toward the illustrated operative position. The carrier 67 is releasably held in such operative position by the locking bolt 70. The severing device is then ready for use.

When the ram 4 performs a downward stroke, i.e., when the films 3 which are to be spliced together by means of a uniting band 30a assume the positions shown in FIG. 2, the edge 28A of the mobile knife 28 cooperates with the inclined edge 31A of the counterknife 31 to sever the tape 30 in a direction from the one toward the other marginal portion of the tape. The notches 31a in the cutting edge 31A of the counterknife 31 insure that the uniting band 30a is not immediately separated from the next-following portion of the tape 30, i.e., the uniting band 30a remains for a while in the starting position so that it can be properly oriented with respect to the films 3 therebelow prior to bonding to the films. The yieldable mounting of components 31 and 61 of the severing device 60 insures that such components can be displaced in response to expansion of heated ram 4 or move forwardly when the temperature of the ram 4 is reduced. In other words, the distance between the knife 28 and counterknife 31 is the same regardless of the temperature of the ram 4; this guarantees that the separating action of the severing device 60 is not affected by temperature changes and also that the knives 28 and 31 undergo a predictable wear under all operating conditions.

The carrier 67 for the resilient elements 65, 66 is unlocked and pivoted clockwise, as viewed in FIG. 6, when the attendant decides to inspect or replace the knife 28 and/or 31, to gain access to the right-hand groove 2a or to clean the channel 32. The apparatus can be furnished with one or more spare sets of components 31, 61 to reduce the interval of idleness of the apparatus when a worn counterknife must be replaced with a new part. The mobile knife 28 can be secured to the ram 4 by one or more screws or other suitable fasteners, not shown.

The improved separating or severing device 60 exhibits several important advantages. Such advantages will be readily appreciated by considering the drawbacks of tape severing devices which are employed in conventional film splicing apparatus. In such apparatus, the mounting of the single heated movable ram is very complex because the ram must be mounted for movement toward and away from a uniting band at the splicing station as well as for sidewise movement in order to compensate for thermally induced expansion or contraction of its material. In other words, and if the ram is movable vertically toward and away from the splicing station, it must be mounted in such a way that it is also capable of moving horizontally in order to insure that the distance between the knife which is mounted on the moving ram and the associated counterknife remains constant at each temperature of the ram. Such lateral movement of the ram is highly undesirable because it brings about changes in the position of the band-contacting surface of the ram relative to the film ends at the splicing station which, in turn, affects the reproducibility of the splicing operation. Moreover, the tape severing devices of conventional film splicing apparatus are not designed to allow for automatic and reliable evacuation of foreign matter (e.g., fragments of tape, fragments of hardened adhesive, dust, etc. from the severing station. Such foreign matter is likely to accumulate between the movable ram and the stationary parts of the severing device. After a relatively short interval of time, the quantity of foreign matter suffices to prevent the ram from moving along a desired path and to an optimum position with respect to the film ends at the splicing station. Moreover, the conventional tape severing device must be equipped with means for holding the tape against any shifting during lowering of the ram, i.e., during movement of the cutting edge of the mobile knife along the cutting edge of the counterknife. As a rule, such holding means comprises a resilient lever or a spring-biased lever and means for mounting the lever at the severing station.

The improved severing device 60 avoids the just discussed drawbacks of conventional severing devices. Thus, and since the knives 28 and 31 are recessed or undercut immediately behind their respective cutting edges 28A, 31A, there is ample room for entry and escape of foreign matter. As can be seen in FIG. 6, the upwardly and leftwardly inclined median surface 28b of the knife 28 immediately above (behind) the cutting edge 28A provides room for entry as well as for escape of fragments of tape, dust or other foreign matter. Analogously, the undercut or recess immediately below (behind) the cutting edge 31A of the counterknife 31 also allows for entry of foreign matter and for automatic evacuation of such foreign matter in response to repeated movements of the ram 4 to its operative position.

Furthermore, and since the holder 61 for the counterknife 31 is yieldably urged toward the mobile upper ram 4 by the springs of resilient elements 65 and 66, the ram 4 can be mounted for simple reciprocatory movement along a straight path, i.e., up and down along the path which is defined by the bearing member 7. Thus, there is no need to provide for lateral movements of the ram 4 in response to changes in its temperature and resultant expansion or contraction of its material. Any expansion or contraction of the ram 4 is compensated for by the resilient elements 65, 66 which urge the holder 61 toward the ram 4 as soon as the carrier 67 is pivoted to and locked in the operative position of FIG. 6. The width of the guide faces 28a and of complementary guide faces 62 on the holder 61 suffices to insure that such guide faces invariably remain in contact with each other and thus insure that the position of the counterknife 31 relative to the path of movement of the mobile knife 28 remains unchanged in all positions of the holder 61, i.e., regardless of thermally induced expansion or contraction of the ram 4. Since the mounting of the ram 5 is practically identical to that of the ram 4, and since the temperature of the end portion 5a of the ram 5 preferably matches or approximates the temperature of the end portion 4a of the upper ram, the thermally induced expansion or contraction of both rams is the same or nearly the same so that the axial alignment of rams 4 and 5 remains unchanged, irrespective of whether the apparatus is in operation for shorter or longer periods of time. Continuous accurate axial alignment of rams 4 and 5, combined with yieldable mounting of the holder 61 for the counterknife 31, insures that the position of cutting edge 28A relative to the cutting edge 31A (while the edges sever the tape 30) is always the same so that the quality of cuts remains unchanged. The retention of cutting edge 31A in unchanged position relative to the mobile cutting edge 28A is further facilitated due to the provision of aforediscussed undercuts immediately behind both cutting edges, i.e., foreign matter cannot accumulate at those sides of the knives 28, 31 which face each other and, therefore, foreign matter cannot move the counterknife 31 away from the path of the mobile knife 28 when the ram 4 performs a stroke from the retracted toward the operative position.

The provision of aforediscussed notches 31a in the cutting edge 31A of the counterknife 31 also contributes to the making of more satisfactory splices. Thus, when the cutting edge 28A already moves to a level below the discharge end of the channel 32, the nearly completely separated uniting band 30a continues to adhere to the next-following portion (fresh leader) of the tape 30 by two narrow strands which remain intact owing to the provision of notches 31a. This contributes to stabilization of the freshly formed uniting band 30a immediately prior to contact with the end portion 4a of the ram 4 as well as with the upper sides of film ends 3L, 3T at the splicing station SST. Predictable positioning of uniting bands 30a insures proper contact with the end face of the ram portion 4a and hence the making of an eye-pleasing, strong and reliable splice.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

What is claimed is:

1. Apparatus for splicing successive flexible strips end-to-end, particularly for splicing exposed photographic films by means of uniting bands whose uniting action is enhanced by heating, comprising means for conveying successive strips along a predetermined path so as to place the leading end of each next-following strip close to the trailing end of the preceding strip at a splicing station which constitutes a portion of said path; a source of heatable uniting bands, including a ribbon of coherent uniting bands; means for feeding uniting bands seriatim from said source into register with the ends of strips at said station, including means for transporting said ribbon along a second path between said source and said station first forwardly so as to place the leader of said ribbon into register with the ends of strips at said station and thereupon rearwardly; means for separating the leader at said station from the next-following portion of said ribbon prior to rearward movement of said next-following portion of said ribbon whereby the separated leader constitutes a uniting band; and means for attaching the band at said station to the adjacent ends of strips, including first and second splicing members facing each other and located at the opposite sides of the ends of strips at said station, with a uniting band disposed between said first member and the ends of strips, means for heating said members, and means for moving at least one of said members between retracted and operative positions in which said one member is respectively remote from and nearer to the other of said splicing members so that said members heat and thereby bond the uniting band therebetween to the adjacent ends of strips in said operative position of said one member.

2. Apparatus as defined in claim 1, wherein said moving means includes means for moving said other splicing member toward said one splicing member simultaneously with movement of said one splicing member to said operative position.

3. Apparatus as defined in claim 2, wherein said splicing members are coaxial with each other and are reciprocable toward and away from each other, and further comprising bearing means for said splicing members.

4. Apparatus as defined in claim 3, wherein one of said splicing members comprises two substantially coaxial sections and resilient means interposed between said sections and arranged to store energy in said operative position of said first mentioned one member.

5. Apparatus as defined in claim 1, wherein said first splicing member is said one member and said separating means includes a severing device having a knife movable with said first splicing member and a counterknife adjacent the path of movement of said knife, said knife and said counterknife being located at the opposite sides of said second path in the retracted position of said first splicing member.

6. Apparatus as defined in claim 5, wherein said second path is inclined with respect to said first mentioned path.

7. Apparatus as defined in claim 5, wherein said severing device further comprises a yieldable support for said counterknife.

8. Apparatus as defined in claim 5, wherein said severing device includes holder means defining a channel for said ribbon, said channel having a discharge end adjacent said splicing station and said counterknife being adjacent said discharge end.

9. Apparatus as defined in claim 8, further comprising guide means for maintaining the ends of strips at said splicing station in a first plane, said channel being located in a second plane adjacent to and substantially parallel with said first plane.

10. Apparatus as defined in claim 1, wherein said transporting means includes means for moving said ribbon forwardly through a longer first distance and for moving said next-following portion of said ribbon rearwardly through a shorter second distance, the difference between said first and second distances being equal to or approximating the length of a uniting band, as considered in the longitudinal direction of said second path.

11. Apparatus as defined in claim 10, wherein said ribbon moving means includes a pressure roll at one side of said second path and a driven rotary member at the other side of said second path opposite said roll.

12. Apparatus as defined in claim 11, wherein said roll and said rotary member comprise means for minimizing the area of contact with the ribbon.

13. Apparatus as defined in claim 12, wherein said contact minimizing means includes at least one circumferential groove provided in the periphery of said roll.

14. Apparatus as defined in claim 13, wherein said contact minimizing means further comprises at least one row of projections extending from the periphery of said rotary member in line with said groove.

15. Apparatus as defined in claim 14, wherein said projections are needles.

16. Apparatus as defined in claim 10, further comprising means for synchronizing the operation of said ribbon moving means with the operation of said means for moving said one splicing member between operative and retracted positions.

17. Apparatus as defined in claim 16, wherein said synchronizing means comprises a transmission.

18. Apparatus as defined in claim 16, wherein said synchronizing means comprises a reversible prime mover.

19. Apparatus as defined in claim 16, wherein said means for moving said one splicing member comprises a first rotary cam and said synchronizing means includes a second rotary cam, means for rotating one of said cams in response to rotation of the other of said cams, and means for transmitting motion from said second cam to said ribbon moving means.

20. Apparatus as defined in claim 19, wherein said motion transmitting means includes a lever receiving motion from said second cam, a connecting rod receiving motion from said lever, and a planetary transmission interposed between said connecting rod and said ribbon moving means.

21. Apparatus as defined in claim 1, further comprising means for locating the leader of said ribbon at a predetermined distance from said splicing station prior to actuation of said transporting means to move the ribbon forwardly.

22. Apparatus as defined in claim 21, wherein said locating means comprises a stop which is movable into and from said second path.

23. Apparatus as defined in claim 1, wherein said separating means includes a severing device having a first knife provided on said one splicing member and including first guide faces parallel to the direction of movement of said one splicing member between operative and retracted positions and a first cutting edge extending transversely of and between said guide faces, a holder adjacent said one splicing member and having second guide faces slidably engaging said first guide faces, means for biasing said holder against said one splicing member, and a second knife provided on said holder, said knives being located at the opposite sides of said second path in the retracted position of said one splicing member and said second knife having a second cutting edge which cooperates with said first cutting edge to sever the ribbon during movement of said one splicing member to said operative position.

24. Apparatus as defined in claim 23, wherein at least one of said knives has a recess immediately behind the respective cutting edge.

25. Apparatus as defined in claim 23, wherein said holder has a first portion adjacent the path of movement of said one splicing member and provided with said second guide faces and a second portion defining a channel through which the leader of said ribbon passes on its way to said splicing station, said channel having a discharge end adjacent said station and further comprising means for securing said second knife to said second portion of said holder in the region of said discharge end.

26. Apparatus as defined in claim 23, wherein said holder includes means for guiding the strips in said first path.

27. Apparatus as defined in claim 26, wherein said means for guiding has a groove for one marginal portion of each strip passing through said splicing station.

28. Apparatus as defined in claim 23, wherein said second cutting edge has at least one notch.

29. Apparatus as defined in claim 23, wherein one of said cutting edges is inclined with respect to the other cutting edge.

30. Apparatus as defined in claim 23, wherein said second knife is undercut behind said second cutting edge.

31. Apparatus as defined in claim 23, wherein said means for biasing said holder includes a carrier movable to and from an operative position and at least one spring reacting against said carrier and bearing against said holder in the operative position of said carrier.

32. Apparatus as defined in claim 31, further comprising means defining for said carrier a pivot axis for movement of said carrier to and from said operative position thereof.

33. Apparatus as defined in claim 1, further comprising means for pulling said preceding strip lengthwise of said path immediately upon completed bonding of a uniting band to the ends of strips at said splicing station.

34. Apparatus as defined in claim 1, wherein said moving means includes means for moving each of said splicing members between a retracted and an operative position, said moving means including two rotary cams, means for rotating said cams, and means for transmitting motion from said cams to said splicing members.

35. Apparatus as defined in claim 34, wherein said splicing members are disposed at the same distance from the strips at said station in the retracted positions of said splicing members.

* * * * *